United States Patent [19]
Bardin et al.

[11] 4,133,764
[45] Jan. 9, 1979

[54] RETAINING DEVICE FOR APPARATUS HAVING SEMI-PERMEABLE MEMBRANES

[75] Inventors: Robert Bardin, Vienne; Hubert Leymarie, Villeurbanne, both of France

[73] Assignee: Rhone-Poulenc Industries, Paris, France

[21] Appl. No.: 640,928

[22] Filed: Dec. 15, 1975

[30] Foreign Application Priority Data

Dec. 18, 1974 [FR] France .................................. 74 41791

[51] Int. Cl.² ............................................. B01D 31/00
[52] U.S. Cl. .................................. 210/236; 210/321 B
[58] Field of Search ..................... 210/232, 541, 321 B, 210/306, 122

[56] References Cited

U.S. PATENT DOCUMENTS

| | | | |
|---|---|---|---|
| 3,341,022 | 9/1967 | Isreeli | 210/232 |
| 3,734,298 | 5/1973 | Riede et al. | 210/541 X |
| 4,039,455 | 8/1977 | Bardin et al. | 210/34 B X |

*Primary Examiner*—Frank A. Spear, Jr.
*Attorney, Agent, or Firm*—Cushman, Darby & Cushman

[57] ABSTRACT

A retaining device for fluid treatment apparatus having a stack of membranes and spacers in which the stack is clamped between two end plates which are provided with a projection or opening and two side plates which are provided with an opening or projection co-operating therewith, movement of the sideplates relative to the end plates, parallel to the end plates, effecting movement together of the end plates due to inclined surfaces on the projections and/or openings.

13 Claims, 11 Drawing Figures

RETAINING DEVICE FOR APPARATUS HAVING SEMI-PERMEABLE MEMBRANES

The present invention relates to a retaining device for an apparatus having flat semi-permeable membranes, such as an exchange or separating apparatus. The device is particularly suitable for apparatuses used especially in the medical field, as haemodialysers or as blood oxygenators.

Exchange or separating apparatuses having flat membranes, denoted hereafter by the general term "module," usually consist of a stack of membranes and spacers clamped inside a retaining device. The latter generally consists of two plates (which will be denoted hereafter by the terms "upper plate" and "lower plate" whatever the orientation of the apparatus may be in use) connected by a set of bolts or by riveted tie-rods, or by a system of U-clamps which may or may not be adjustable. The thickness of the stack is not generally identical from one module to another.

The retaining devices having bolts, riveted tie-rods or adjustable U-clamps are generally very suitable, but they are rather difficult to manufacture. The initial clamping of the devices having bolts or adjustable U-clamps can be put out of adjustment or changed at the time of use, and this can lead to either a defect in leak-proofness or, on the other hand to objectionable deformation of the exchange zones, as well as to excessive stresses which can lead to the rupture of certain elements of the module. Riveting operations, for their part, require specialised equipment and the presence of fillers (generally glass fibres) in the material of which the tie-rods are made can cause wear of the tool for shaping the rivet head.

The retaining devices having non-adjustable U-clamps are also generally very suitable, but they do not make it possible to adjust the clamping force to the thickness of the stack of membranes and spacer sheets.

According to the present invention we provide a retaining device for fluid treatment apparatus having a stack of membranes and spacers, such device comprising two rigid end plates and at least one side member, co-operating anchoring means carried by at least one of said end plates and said at least one side member comprising at least one opening and at least one co-operating projection insertable in the opening, the at least one projection and opening having abutting faces, at least one of which is inclined to the plane of the end plate, the side member and end plates being relatively movable in a direction parallel to the end plates to effect movement of the end plates towards one another under the action of said co-operating inclined faces.

Such a device is practically impossible to put out of adjustment, avoids the disadvantages of the prior art and is simple and economical to manufacture. The device is not subject to inopportune unclamping of the elements of the module and ensures that the stack is clamped under a pressure which is the same from one module to another.

In order that the invention will be better understood, the following description is given, merely by way of example, reference being made to the accompanying drawings, in which.

Figure 1:
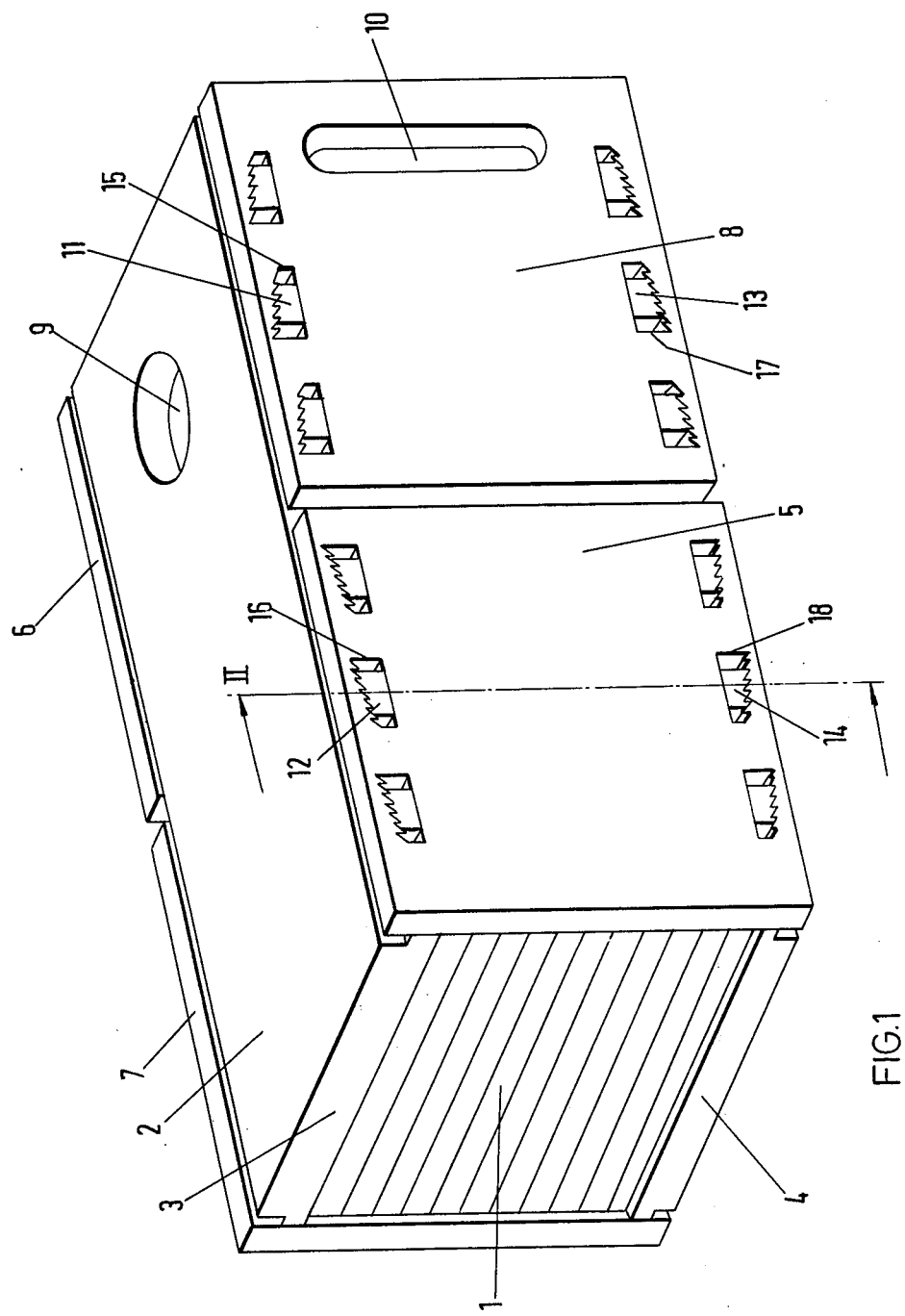
FIG. 1 is a perspective view of one embodiment of device according to the invention.
Figure 2:
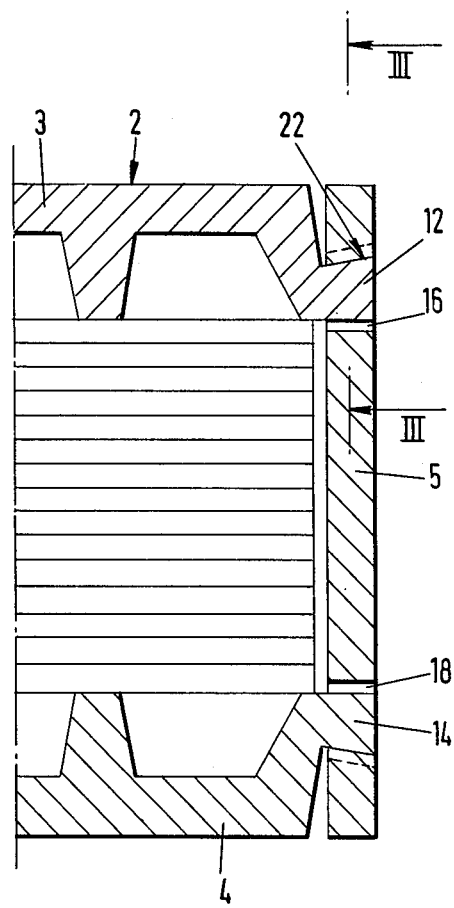
FIG. 2 is a fragmentary cross-section taken along line II—II of FIG. 1.

The module represented in FIGS. 1 and 2 consists of a stack 1 of membranes and spacers held clamped inside a retaining device 2 according to the invention.

This retaining device 2 consists of two rigid end plates 3 and 4 and an anchoring system formed by four side plates 5, 6, 7 and 8. The side plates are provided with means which enable them to be locked onto the rigid end plates 3 and 4.

In the remainder of the text, it is to be understood that the term "stack" will denote the combination formed by superposing spacers and membranes which have been cut out beforehand; it can also denote the combination consisting of spacers introduced between the folds of a membrane which has been folded, for example, in a zig-zag arrangement. The term "stack" will also denote the combination formed by folding, for example, in a zig-zag arrangement, at least one membrane firmly fixed to its support.

The term "opening" will denote the hollowed out part situated either in the end plates, or in the side plate or other side member which plays a part in locking the module.

The term "projection" will denote the element firmly fixed either to the end plates, or to the side plate or other side member and which is engageable in the opening in order to ensure that the side plate is locked onto the end plate.

The term "toothed rack" will denote a surface equipped with preferably parallel notches.

The term "plane of the end plate" will denote any plane whatsoever to which the membranes, the spacers and the upper and lower end plates are parallel.

The term "inclined face" will denote one of the surfaces which are inclined relative to the plane of the end plates and over which the clamping force applied to the stack is distributed.

The rigid plates 3 and 4 can be provided at their periphery with at least one projection 11, 12, 13, 14) and the side plates can have at least one opening 15, 16, 17, 18 positioned to co-operate with the projections.

Referring more particularly to FIG. 2, the combination of the projection 14 at the periphery of the end plate 4, and of the opening 18 of the side plate 5 plays a part in locking the side plate 5 onto the end plate 4, and the combination of the projection 12 at the periphery of the end plate 3 and of the opening 16 in the side plate 5 plays a part in locking the side plate 5 onto the end plate 3.

Figure 3:
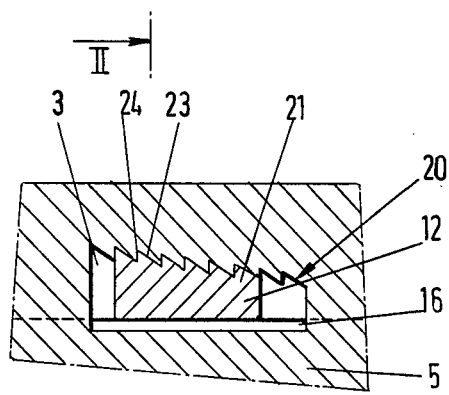
FIG. 3 is a fragmentary cross-section taken through a plane III—III of a stop/opening combination of the device according to FIGS. 1 and 2.

Referring more particularly to FIGS. 2 and 3, it can be seen that the projection 12 and the opening 16 have, in cross-section through a plane perpendicular to the end plates 3 and 4 the general shape of rectangular trapezia, the bases and the height of which are respectively perpendicular and parallel to the plane of the end plates. The side faces 20 of the rectangular trapezium of the opening 16 and the side 21 of the rectangular trapezium of the projection 12 are, in their entirety, substantially inclined relative to the plane of the end plates, the side 21 being identical to a part of the side 20. The sides 20 and 21 represent, in cross-sectional plane III—III, two inclined faces 20 and 21, the general shape of which is flat, which belong respectively to the opening face 20 and to the projection (face 21) and which appear in their common part at 22 on the cross-section represented in FIG. 2. These inclined faces are inclined planes, the inclined face of the projection 12 being substantially identical to the inclined plane of the opening 16.

At least one of the surfaces of the inclined faces of the projections and the openings, and preferably the surfaces of all the inclined faces, can be roughened, for example, the surface can be knurled, ribbed, crackled, grained, notched, grooved, toothed or corrugated. The surface of the inclined faces preferably has the appearance of a toothed rack equipped with asymmetric notches which make it possible to translate the side sheets in one direction and which oppose translation in the opposite direction. Thus, the asymmetric notches make it possible to clamp the stack by means of the plates, and oppose unclamping.

As shown, the notches have one face 23 inclined in the same direction as the inclined faces, and the other face 24 substantially perpendicular to the plane of the end plates.

Moreover, the inclined faces can optionally be slightly inclined from the outside towards the inside of the module (see FIG. 2) to avoid any displacement of the side plates outwardly from the module.

The openings and the projections in the zone where the side plate 5 is locked onto the end plate 3 have their inclined faces all inclined at the same angle relative to the plane of the end plates; likewise, the openings and the projections in the zone where the side plate 5 is locked onto the end plate 4 have their inclined faces all inclined at the same angle relative to the plane of the end plates. The inclined faces situated in the locking zone involving the end plate 3 and the inclined faces situated in the locking zone involving the end plate 4 are inclined in such a way that they make it possible to move the end plates 3 and 4 closer together and consequently enable the stack 1 to be clamped. For preference, as represented in FIG. 1, these inclined planes are symmetrical relative to a plane parallel to the end plates 3 and 4.

Referring to FIG. 1, the device represented consists of two end and four side plates. The number of side plates can be between 2 and 30, and is preferably between 2 and 20. The number of side plates and their dimensions will advantageously be chosen in accordance with the dimensions of the module.

The side plates and/or the end plates can advantageously have orifices, for example orifices 9 and 10, in order to allow pipelines to pass through, these pipelines connecting the module to the various circuits.

On two adjacent side plates, the openings which permit locking onto one and the same end plate can have their inclined faces all inclined in the same direction; locking of the module is then effected by moving the two side plates in the same direction relative to the end plate in a direction parallel to the plane of the end plates.

On two adjacent side plates, for example side plates 5 and 8, the inclined faces of locking zones are preferably respectively inclined in the opposite direction on one side plate and on the other, and locking of the module is then effected by moving the two side plates in the opposite direction. For preference, the inclined faces are inclined, as represented in FIG. 1, in a direction which makes it possible to clamp and lock the module by moving the two side plates on one side of the stack close together.

The openings and the projections are, on one and the same side plate, preferably and respectively all identical and aligned.

The end plates can optionally be provided over their entire periphery with projections, and the module can be equipped on all its side faces with side plates locked onto the two end plates.

The general shape of the projections and of the openings can be any simple geometric shape which has one face which is inclined relative to the plane of the end plates. For example, the openings can be triangular and the projections trapezoidal but of dimensions such that they can shift in the openings, their respective inclined faces remaining in contact.

The inclined faces can be inclined at an angle of between 1° and 30° relative to the plane of the plates. An angle of less than 1° does not permit sufficient amplitude of adjustment and an angle of more than 30° is not necessary, in view of the precision with which the various elements forming the stack are produced. The inclined faces are preferably inclined at an angle of between 3° and 20°.

The inclined faces need not have a general shape which is flat; they can thus be portions of a cylindrical surface with a constant radius of curvature, these portions being symmetrical relative to a plane parallel to the end plates 3 and 4; their concave or their convex disposition can then be turned towards this plane of symmetry.

The various elements of the module can be assembled in the following way. The stack of spacers and membranes is positioned on the lower plate and this stack is covered by the upper plate.

The combination thus formed is then placed between the jaws of a press (not shown) and a force is exerted on this combination such that the compressive force resulting therefrom, between the various elements forming the stack, is sufficient to ensure leakproofness and so that the elements of the module are subjected to only moderate stresses. The module thus achieves a between-plate thickness which is characteristic of it and which can vary slightly from one module to another.

A side plate is presented in such a way that its openings are opposite the projections of the upper and lower plates, the openings are then engaged on the projections, and the side plate is made to effect a translational movement relative to the stack until the inclined faces of the openings of the side plate come into contact with the inclined faces of the projections carried by the end plates. The operation is repeated for each of the other three side plates, and the force of the press is relaxed. The notches of the inclined faces of the projections then occupy the spaces situated between the notches of the inclined faces of the openings. The asymmetry of the notches prevents any translational movement of the inclined faces of the openings relative to the inclined faces of the projections, since such a translational movement would tend to unclamp the stack. The module is freed from the press and it then remains locked.

As soon as the effect of the press ceases, the side plates are subjected to a tensile force which balances elastically the force resulting from the compression of the elements of the stack. The side plates then lengthen very slightly and the thickness of the module becomes substantially equal to its characteristic thickness. As a result of this, the internal compartments thus acquire their design dimensions which are necessary to permit good exchange or transfer reactions through the membranes. It has been found that these characteristics are retained for a very long time.

Different embodiments, which lie within the ability of those skilled in the art, form part of the present invention. For example, the following arrangements may be mentioned as variants, without implying a limitation.

The retaining device can be similar to that shown in FIGS. 1 and 2, but the inclined faces need not carry visible roughnesses. The side plates are then held in position by friction between the surfaces of the inclined faces of the projections and the inclined faces of the openings. It is optionally possible, during assembly, to coat one and/or the other inclined face with glue. The assembling of such a device is analogous to that described above.

The retaining device can also have two end plates carrying, at their periphery, sunken recesses having an inclined face; these sunken recesses are similar to the openings described above. The side plates in that case have projections on the face situated towards the inside of the module; these projections are similar to the projections described above and correspond to the sunken recesses carried by the end plates. The assembling of such a device is analogous to that described above.

Figure 4:
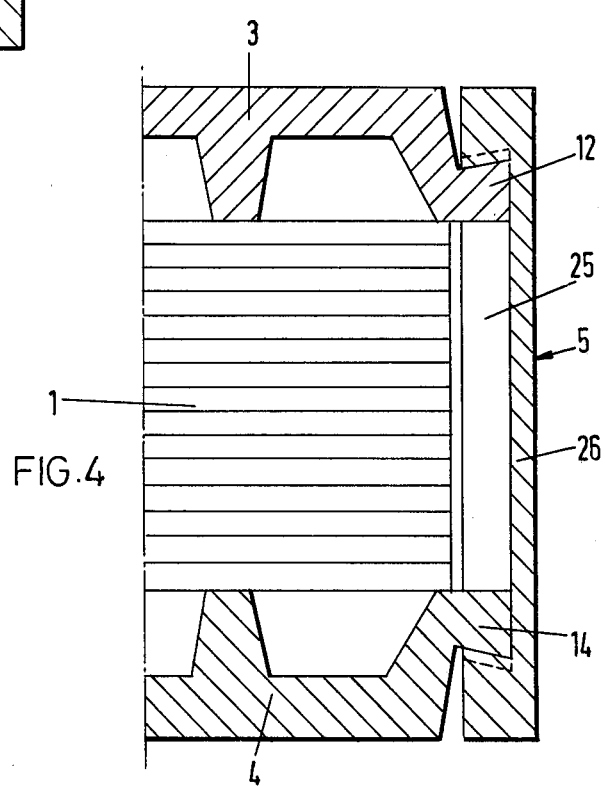
FIG. 4 is a fragmentary cross-section of a second embodiment of the device of the invention.

Another embodiment of the retaining device which is the subject of the invention is represented in cross-section in FIG. 4 (this cross-section is produced in an analogous manner to that of FIG. 2). The end plates 3 and 4 of this device carry projections 12 and 14 at their periphery, and the side plates, for example plate 5, have openings, for example opening 25, which connect the inclined faces anchoring onto the projection 12 of the end plate 3 and the projection 14 of the end plate 4. The opening 25 can optionally be sealed towards the outside of the module by a covering 26 which increases the rigidity and the strength of the side plate 5 whilst giving the module a good external appearance, after assembling. The assembling of such a device is analogous to the assembling of the device represented in FIGS. 1 and 2.

Figure 5:
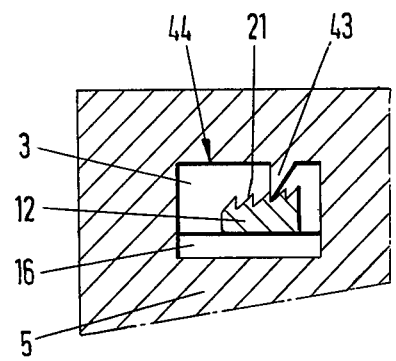
FIGS. 5 and 6 are two views in cross-section (through a line analogous to that of FIG. 3) of two further embodiments of a projection/opening combination of the device of the invention.

The embodiment of the projection/opening combination shown in FIG. 5 has a projection 12 carried by the upper plate 3 analogous to the projections of FIGS. 1, 2 and 3. The opening 16 in the side plate 5 is substantially rectangular, and its face 44 is substantially parallel to the plane of the end plates and, opposite the inclined face 21 of the projection 12, carries a tooth 43. The inclined face 21 of the projection and the tooth 43 ensure that the projection and the opening bear on each other.

Figure 6:
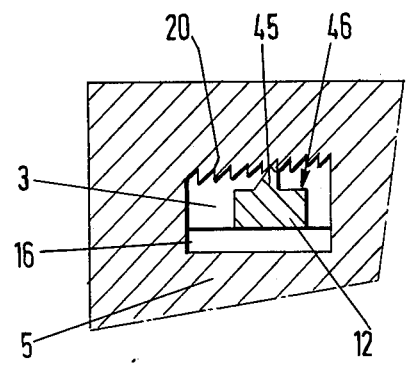

Another embodiment of the projection/opening combination is represented in FIG. 6. The inclined face 20 is carried by the opening 16, and the projection 12 has a substantially rectangular cross-section and has a tooth 45 on its face 46 which is opposite the inclined face 20.

The projection/opening combinations according to the different embodiments described above, situated in the zones where locking onto the end plates 3 and 4 takes place, are preferably symmetrical relative to a plane parallel to the end plates 3 and 4.

Figure 7:
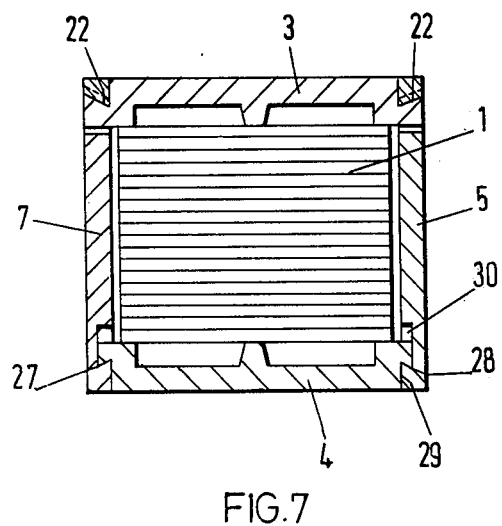
FIG. 7 is a cross-section of a third embodiment.

The device represented in cross-section in FIG. 7 has an upper end plate 3 with stops provided with an inclined face 22 carrying a toothed rack, a lower end plate 4 with two slide-bars 27 and 28, and two side plates 5 and 7. The two side plates have nicks carrying an inclined face having a toothed rack in the zone where locking onto the upper end plate 3 takes place and grooves corresponding to the slide-bars 27 and 28 in the zone where locking onto the lower end plate 4 takes place. The slide-bars and the grooves are preferably discontinuous; a break in formation such as 30 in the side plate 5 and a break in formation such as 29, at right angles with the slide-bars and extending to the external face of the module, in the plate 4 make it possible to engage the grooves with the slide-bars. The length of the slide-bars is moreover less than the length of the grooves.

The various elements of the module utilising the retaining device according to the variant represented in FIG. 7 can be assembled in the following way. The stack is placed on the lower end plate and this is covered by the upper end plate. The combination thus formed is then placed between the jaws of a press, the desired force is exerted on the combination, the grooves of the side plates are engaged in the slide-bars carried by the lower end plate and the openings are engaged on the projections carried by the upper end plate, the side plates are then moved relative to the stack until the inclined faces of the openings of the side plates come into contact with the inclined faces of the projections carried by the upper end plate, and the slide-bars of the lower end plate slide in the grooves carried by the side plates. The force is relaxed and the module, which remains locked in this way, is freed.

Figure 8:
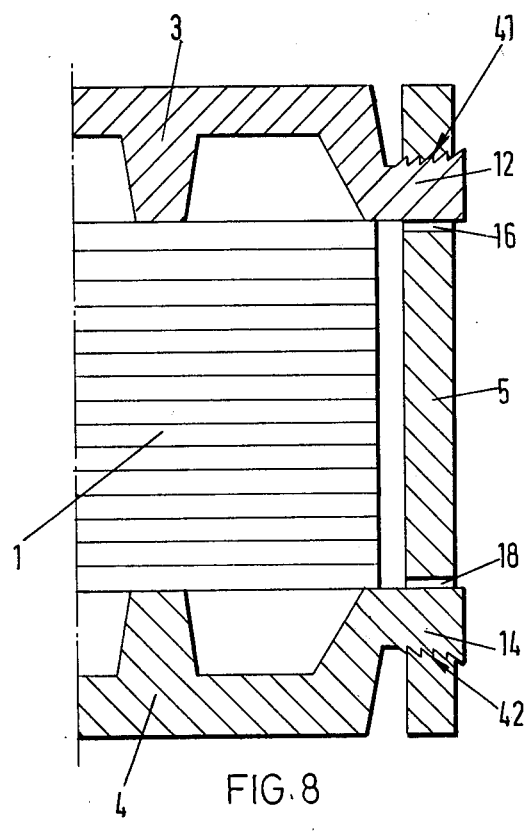
FIG. 8 is a fragmentary cross-section of a fourth embodiment.

The device according to the invention can also be produced as represented in cross-section in FIG. 8. The end plates 3 and 4 of this device carry projections 12 and 14 at their periphery, and the side plates, for example plate 5, has openings, for example openings 16 and 18. The projections are analogous to the projections of the device of FIGS. 1 and 2 but their inclined faces 41 and 42, which are symmetrical relative to a plane parallel to the end plates, are inclined from the outside towards the inside of the module and the notches of their toothed racks are substantially parallel to the plane of the end plates and to the face of the stack in front of which they are situated. The openings 16 and 18 are formed with inclined faces corresponding to the inclined faces of the projections. The notches of the inclined faces of the projections and of the openings are advantageously asymmetric in order to permit movement of the inclined faces of the openings relative to the inclined faces of the projections from the inside of the module towards the outside of the latter, whilst preventing any movement in the opposite direction, which would tend to unclamp the stack.

In the device represented in FIG. 8, the stack is clamped by effecting a movement of the side plates from the inside of the module towards the outside; this movement tends to move the end plates 3 and 4 closer together.

The inclined faces 41 and 42 can also be inclined from the inside of the module towards the outside; the stack is then clamped by effecting a movement of the side plate from the outside towards the inside of the module; this movement tends, in this case, to mvoe the end plates 3 and 4 closer together, whilst the asymmetry of the notches prevents any movement in the opposite direction, which would tend to unclamp the stack.

The side plate 5 can be very thin and made from a material possessing mechanical properties which are sufficient to withstand the tensile force to which the side plate is subjected; in this case, it can be likened to a side plate provided with openings equipped with a single tooth.

The assembling of such a device is analogous to the assembling of the device represented in FIGS. 1 and 2, the side plates being moved as described above.

Figure 9:
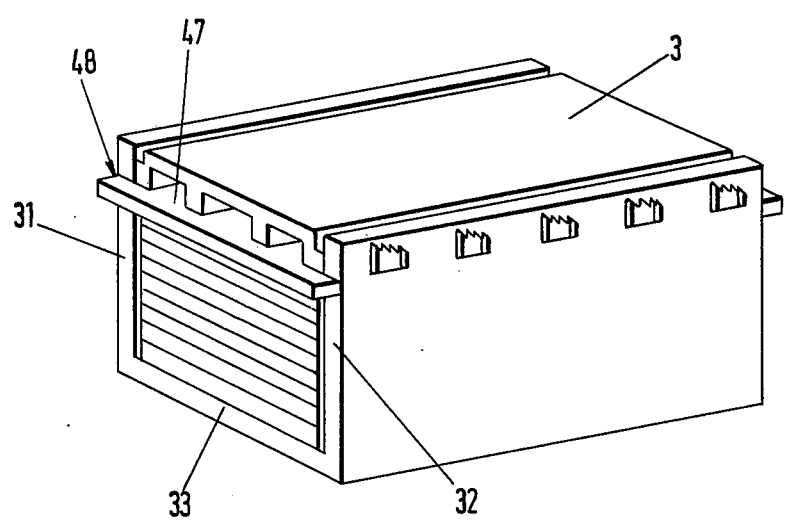
FIG. 9 is a perspective view of a fifth embodiment.

Another embodiment of the device which is the subject of the invention can have at least one side plate firmly fixed to one of the end plates. Optionally as shown in FIG. 9, the device can consist of two flexible side plates 31 and 32 firmly fixed to an end plate 33 (that is to say, made in a single piece with this end plate); the combination then forms a channel; the side plates 31 and 32 of which are the flanges and the end plate 33 of which is the web. The free end of the flanges is then provided with means which enable them to be locked onto the other end plate. These means are advantageously identical to those represented in FIG. 2. The end sheet 47 of the stack is preferably prevented from effecting a translational movement by any known means, for example by a lug 48.

The thickness of the flanges 31 and 32 is preferably chosen so that it enables them to be separated by a sufficient amount to introduce the end plate 3 at the time of locking the retaining device according to the invention.

The various elements of the module utilising the device according to this embodiment can be assembled in the following way. The stack is positioned on the base of the channel and this stack is covered by the upper plate 3. The combination thus formed is placed between the jaws of a press, and the desired force is then exerted on this combination, whilst keeping the flanges 31 and 32 apart. The side plates are freed and their openings become engaged on the projections of the end plate 3. Whilst maintaining the force, the end plate 3 is then moved relative to the stack until the inclined faces of the openings of the flanges 31 and 32 come into contact with the inclined faces of the projections carried by the end plate 3. The end plate 3 slides on the end sheet 47 and, consequently, the stack of membranes and spacers does not run the risk of being shifted. The force is relaxed and the module, which remains locked in this way, is freed.

The retaining device can optionally have side plates such as 31 and 32 which are hinged, so that they can slide on the lower end plate 34 by any known means, for example by hinges.

Figure 10:
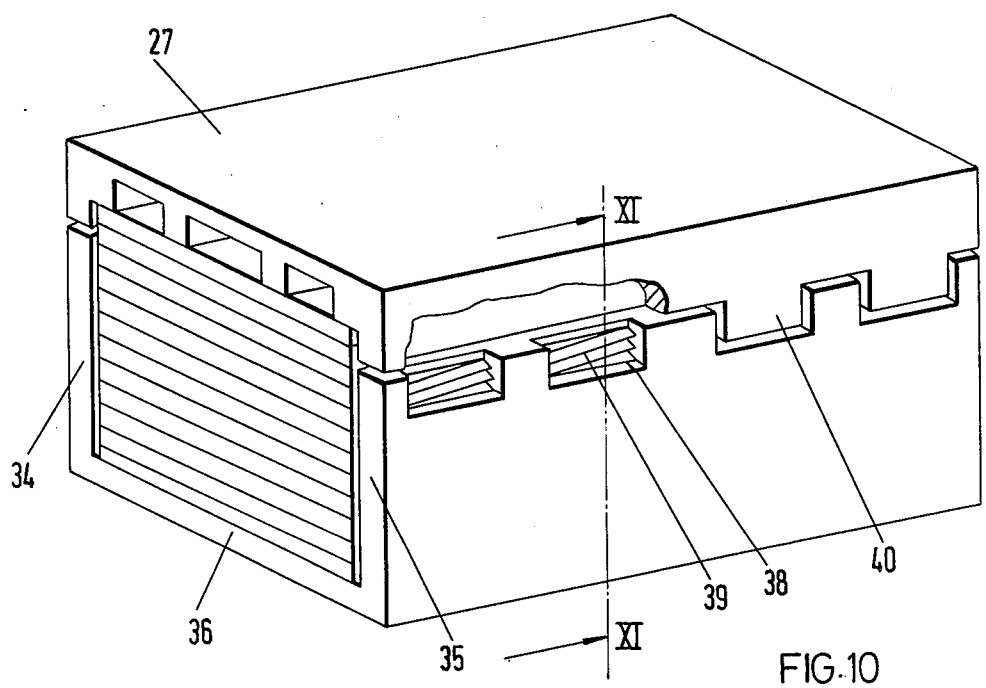
FIG. 10 is a perspective view, partly in cross-section, of another embodiment.
Figure 11:
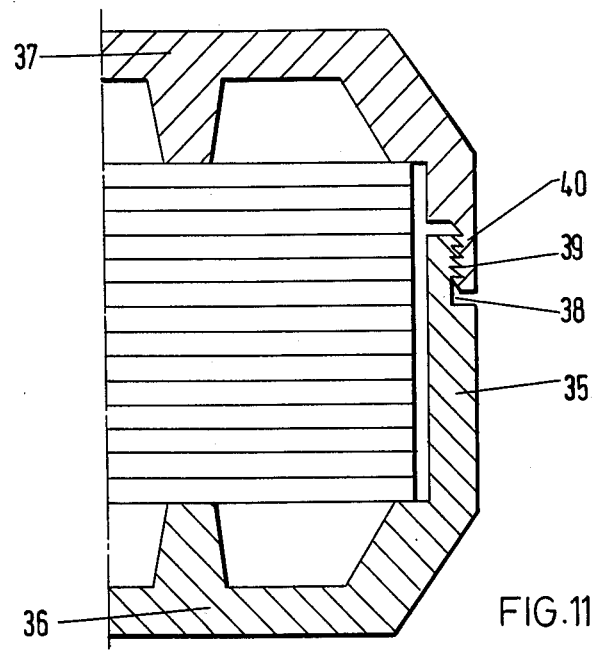
FIG. 11 is a fragmentary cross-section taken along the line XI—XI of the device according to FIG. 10.

Another embodiment of the device according to the invention is represented in FIGS. 10 and 11. The device consists of two side plates 34 and 35 firmly fixed to an end plate 36 and the combination thus forms a channel, the side plates 34 and 35 of which are the flanges and the end plate 36 of which is the web. The free end of each flange is then provided with means which enable them to be locked onto the other end plate 37. These means consist, on the flanges 34 and 35, of openings 38 having elongated notches 39 which are inclined relative to the plane of the end plates and which are substantially parallel to the faces of the flanges 34 and 35, and of projections 40 carried by the end plate 37. The projections are also formed on their inner face with notches advantageously corresponding to the notches carried by the openings. In this case, the inclined faces are formed by the combination of the elementary faces of the notches situated on the openings and on the projections.

The various elements of the module utilising the device according to this embodiment can be assembled in the following way. The stack is positioned on the web of the channel and this stack is covered by the end plate 37. The combination thus formed is placed between the jaws of a press, the desired force is then exerted on this combination, and the notches carried by the projections firmly fixed to the plate 37 become anchored to the notches carried by the openings of the flanges 34 and 35; the presence of several notches makes it possible to adjust the retention device so that the stack is subjected to the desired compressive force, and the slope of the notches makes it possible to refine the adjustment by causing the plate 37 to effect a translational movement along the length of the channel. The force is relaxed and the module thus obtained, which remains locked, is freed.

The invention is in no way limited to the various embodiments of the device and to the variants described above; it is to be understood that it would not go outside the scope of the invention to combine two or more embodiments or variants with one another.

The end plates and the side plates can be made from materials which may or may not be different and which may or may not be homogeneous. In particular, they can be reinforced, for example by a metal frame. They can comprise metal elements (for example, made of an aluminium alloy or of steel) or elements made of thermoplastic materials, such as polyolefines, polyamides, acrylic resins, polystyrene, their mixtures or copolymers which have, in particular, good mechanical characteristics, and in particular good flexural and tensile strengths. Thermoplastic materials to which reinforcing fillers (especially asbestos, carbon and preferably glass fibres) have been added are preferably employed.

The module thus formed can be of the exchange type, that is to say it can have compartments which allow two liquid or gaseous fluids to flow on either side of a membrane. It can also be of the separating type, that is to say it can have compartments which allow a fluid to flow and, separated from these compartments by a membrane, other compartments which allow a component of this fluid to be collected and removed. The internal arrangements of the elements of the stack can be of any known type. There can be any number of spacer sheets and the nature of the materials of which they are formed can be very diverse.

The compartments can be supplied either in series or in parallel or by any series/parallel combination whatsoever. The pipelines for introducing or removing the fluids, connecting the module to the zone outside, can consist of manifolds positioned perpendicularly to the stack and can pass through the end plates of the retaining device via suitable orifices. They can also be and preferably are positioned laterally parallel to the elements of the stack. In the latter case, they are connected to an external pipeline via a manifold through an orifice in a side plate; the said manifold has no connections with the retaining device.

The retaining device which is the subject of the invention makes it possible to ensure that the stack is clamped under a pressure which is the same from one module to another, that is to say that the elements of two or more different modules are subjected to the same compressive force, this compressive force having been determined as being necessary and sufficient to ensure leakproofness. The retaining device according to the invention has the advantage of dispensing with the use of calibrated elements in order to be able to achieve the desired leakproofness.

The retaining device according to the invention avoids any subsequent change in the initial clamping of the stack of spacers and membranes. This clamping must thus be sufficiently well adjusted so that leakproofness of the module is achieved from the start and is retained, so that the thickness of the compartments is and remains suitably calibrated, and so that the elements of the module are subjected to only moderate stresses.

The retaining device according to the invention can optionally be dismantled and reused. In fact, the stack can be clamped again, by means of a press, until it is possible easily to free the notches of the toothed racks. It is then possible to recover the spacers and the membranes from a module which is not leakproof, or one which has been used, for the purpose of re-using them.

The module can be assembled, tested, sealed and, where appropriate, sterilised in the factory, so as to be delivered ready for use, for example in a sterile packaging. This simple and economical retaining device is suitable for mass production and for prolonged storage, and makes it possible to deliver apparatuses of constant quality which are not subject to inopportune maladjustments. Modules which are to be used only once can be constructed without any metal parts, they can thus be destroyed easily afer use, particularly by incineration.

We claim:

1. In a retaining device for a fluid treatment apparatus having a stack of membranes and spacers, said device comprising two end plates which compress said stack between them, one end plate being a lower plate for supporting said stack, at least two side plates, connecting means on said lower plate and said side plates which connect the lower plate and said side plates, the other end plate being an upper plate adapted to be placed adjacent said stack, and cooperating locking means on said upper plate and said side plates which lock the upper plates to said side plates, at least one of said means being capable of permitting movement of said side plates with respect to at least one end plate, the improvement consisting in that said locking means comprises a plurality of spaced apart openings and a plurality of cooperating spaced apart projections insertable in the openings having abutting faces at least one of which is inclined at an acute angle to the plane of the upper plate, at least some of said side plates and upper and lower plates being relatively movable with respect to one another in a direction parallel to said upper and lower plates, until the point of contact between the abutting faces of the openings and the projections is such that said contact between the abutting faces maintains a compressive force between the various elements forming the stack at a predetermined value, and means on said at least one inclined face enabling maintenance of said compressive force between the various elements forming the stack.

2. A device as claimed in claim 1, wherein at least one of the inclined faces comprises a toothed rack.

3. A device as claimed in claim 2, wherein the toothed rack comprises notches which are substantially perpendicular to the side face of the stack in front of which it is situated.

4. A device as claimed in claim 2, wherein the rack comprises notches which are substantially parallel to the side face of the stack in front of which it is situated.

5. A device as claimed in claim 1, wherein the inclined faces of the projections and openings are inclined in two planes at the same angle relative to the plane of the end plates.

6. A device as claimed in claim 1, wherein said at least one projection or opening comprises a tooth which bears on the inclined face of the other one of said elements.

7. A device as claimed in claim 1, wherein the end plates carry a plurality of projections and the side plates have a plurality of co-operating openings in the end plates.

8. A device as claimed in claim 7, wherein said at least one side plate comprises means enabling it to slide relative to one of the end plates.

9. A device as claimed in claim 7, comprising between two and thirty side plates.

10. A device as claimed in claim 1, wherein the side plates carry a plurality of projections co-operating with a plurality of openings in the end plates.

11. A device as claimed in claim 1, wherein said at least one side plate is firmly fixed to one of the end plates.

12. A device as claimed in claim 1, wherein said at least one side plate is hinged to one of the end plates.

13. A device as claimed in claim 1, wherein said connecting means comprises a plurality of spaced apart openings and a plurality of cooperating spaced apart projections insertable in the openings having abutting faces at least one of which is inclined at an acute angle to the plane of the lower plate, at least some of said side plates and upper and lower plates being relatively movable with respect to one another in a direction parallel to said upper and lower plates, until the point of contact between the abutting faces of the openings and the projections is such that said contact between the abutting faces maintains a compressive force between the various elements forming the stack at a predetermined value, and means on said at least one inclined face enabling maintenance of said compressive force between the various elements forming the stack.

* * * * *